(12) United States Patent
Brychcy et al.

(10) Patent No.: US 7,459,016 B2
(45) Date of Patent: Dec. 2, 2008

(54) METHOD FOR THE PRODUCTION OF PHTHALOCYANINE PIGMENT PREPARATIONS

(75) Inventors: Klaus Brychcy, Frankfurt am Main (DE); Joachim Weber, Frankfurt am Main (DE); Heidrun Mehler, Hirzenhain (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 340 days.

(21) Appl. No.: 10/539,033

(22) PCT Filed: Nov. 27, 2003

(86) PCT No.: PCT/EP03/13362

§ 371 (c)(1), (2), (4) Date: Jun. 11, 2005

(87) PCT Pub. No.: WO2004/052996

PCT Pub. Date: Jun. 24, 2004

(65) Prior Publication Data

US 2006/0112856 A1    Jun. 1, 2006

(30) Foreign Application Priority Data

Dec. 10, 2002   (DE) ............... 102 57 498

(51) Int. Cl.
  C09B 67/12 (2006.01)
  C09B 47/04 (2006.01)
  C09D 11/00 (2006.01)

(52) U.S. Cl. ............ 106/412; 106/410; 106/411; 106/413; 540/122; 540/130; 540/131; 540/132; 540/133; 540/135; 540/136; 540/140; 540/141

(58) Field of Classification Search ......... 106/31.78, 106/410, 411, 412, 413; 430/108.21; 524/88; 540/122, 131, 132, 133, 135, 136, 140, 141
See application file for complete search history.

(56) References Cited

U.S. PATENT DOCUMENTS

| | | | |
|---|---|---|---|
| 3,764,360 A | 10/1973 | Langley et al. | |
| 4,055,440 A | 10/1977 | Wheeler et al. | |
| 4,056,534 A | 11/1977 | Schiessler et al. | |
| 4,104,276 A | 8/1978 | Kranz et al. | |
| 4,104,277 A | 8/1978 | Langley | |
| 4,278,601 A * | 7/1981 | Wheeler et al. | 540/132 |
| 4,298,526 A | 11/1981 | Sappok et al. | |
| 4,313,766 A | 2/1982 | Baraclough et al. | |
| 5,271,759 A | 12/1993 | Wooden et al. | |
| 5,296,033 A | 3/1994 | Dietz et al. | |
| 5,296,034 A | 3/1994 | Dietz et al. | |
| 5,776,238 A * | 7/1998 | Kerwin et al. | 106/412 |
| 5,944,887 A * | 8/1999 | Schutze et al. | 106/411 |
| 6,306,938 B1 | 10/2001 | Mathers et al. | |
| 7,198,667 B2 * | 4/2007 | Klopp et al. | 106/493 |
| 2002/0000177 A1 | 1/2002 | Mathers et al. | |

FOREIGN PATENT DOCUMENTS

| | | |
|---|---|---|
| DE | 2554252 | 6/1977 |
| DE | 2720464 | 11/1977 |
| DE | 2739775 | 3/1978 |
| DE | 2851752 | 6/1980 |
| DE | 4214868 | 11/1992 |
| EP | 0020306 | 12/1980 |
| EP | 0574790 | 12/1993 |
| EP | 0761770 | 3/1997 |
| EP | 0780446 | 6/1997 |
| FR | 2076889 | 10/1971 |
| GB | 1569837 | 6/1980 |
| JP | 11-323166 A * | 11/1999 |
| WO | WO 99/54410 | 10/1999 |
| WO | WO 01/66650 | 9/2001 |

OTHER PUBLICATIONS

U.S. Appl. No. 10/539,034, filed Jun. 11, 2005 by Brychcy et al.
PCT International Search Report for PCT/EP 03/13362, Apr. 27, 2004.
English Translation of PCT IPER for PCT/EP 03/013362, Sep. 1, 2004.
U.S. Appl. No. 10/591,578, by Weber et al, filed Sep. 1, 2006.
Co-pending U.S. Appl. No. 11/792,774, by Ganschow et al., filed Jun. 8, 2007.

* cited by examiner

*Primary Examiner*—Anthony J Green
(74) *Attorney, Agent, or Firm*—Anthony A. Bisulca

(57) ABSTRACT

A method for the production of a phthalocyanine pigment preparation includes finely distributing a crude phthalocyanine pigment by dry milling, wet milling, salt kneading, acid pasting or acid swelling to give a pre-pigment, the pre-pigment is subjected to a finishing treatment in a mixture of water and an organic solvent at alkaline pH, increased temperature and in the presence of at least one pigment dispersant from the group of phthalocyanine sulphonic acids, phthalocyanine carboxylic acids, phthalocyanine sulphonate salts, phthalocyanine carboxylate salts and phthalocyanine suiphonamides.

20 Claims, No Drawings

METHOD FOR THE PRODUCTION OF PHTHALOCYANINE PIGMENT PREPARATIONS

The invention relates to a method for the production of a pigment preparation based on a phthalocyanine pigment and to its use for coloring high molecular mass materials.

When pigments are used to produce printing ink systems there are exacting requirements imposed on the performance properties of the pigments, such as ease of dispersion, printing ink fluidity compatible with the application, high transparency, gloss, color strength, and cleanness of hue. A further desire is that the pigments should be useful universally as far as possible for coloring other high molecular mass systems, such as paints or plastics, for example. Here there are further requirements, some of them asked of prinking inks too, such as, for example, high fastnesses, such as bleed fastness, fastness to overcoating, solvent fastness, light fastness and weather fastness properties. For both printing inks and paints, usefulness in both water-based and solvent-based systems is a desire. In the case of paint systems, there is a requirement not only for pigments of high transparency, especially for metallic coloring, but also for hiding pigments. In the case of paints a desired facility is to be able to prepare paint concentrates (millbases) which are highly pigmented and yet of low viscosity; with the grinding formulations of printing inks, as well, the trend is toward high concentrations of pigmentation.

The synthesis of phthalocyanines has been known for a long time. The phthalocyanines obtained in coarsely crystalline form in the synthesis, and referred to below as crude pigments, cannot be used without comminution to color high molecular mass materials, owing to the inadequate performance properties of the uncomminuted crude pigments.

A variety of methods have been proposed as to how a phthalocyanine pigment can be produced. In principle its production requires the comminution of the coarsely crystalline crude pigments by means for example of acid pasting, acid swelling or dry or wet grinding. The products obtained, referred to below as prepigments, are generally of poor crystal quality and in the form of agglomerates which do not as yet display the desired performance properties. In order to achieve optimum application properties an aftertreatment, generally termed a finish, is carried out, in solvents for example and with the addition of surface-active agents. In this context there have also been proposals, with the aim of improving the performance properties, to produce pigment preparations by using phthalocyanines substituted by sulfonic acid, carboxylic acid or sulfonamide groups.

DE 27 20 464 discloses a method in which a phthalocyanine pigment is subjected to a solvent treatment in the presence of a phthalocyanine-sulfonic salt.

EP 20 306 discloses a method in which after the millbase has been finely divided it is subjected to a treatment at elevated temperature in the presence of a basic phthalocyanine derivative.

EP 574 790 discloses a method in which the fine division is carried out using specific agitated ball mills.

EP 761 770 discloses a method of producing phthalocyanine pigments which adds the phthalocyaninesulfonic salt after the finish in aqueous suspension.

The pigments produced by these methods do not always meet all of the requirements that are now imposed. There is therefore a need for a new method allowing pigments having improved performance properties to be produced efficiently and at favorable cost.

Surprisingly this object has been achieved by the production method described below.

The invention provides a method for the production of a phthalocyanine pigment preparation, said method comprising finely dividing a crude phthalocyanine pigment by means of a method selected from the group consisting of dry grinding, wet grinding, salt kneading, acid pasting and acid swelling to form a prepigment and then subjecting the prepigment to a finish treatment in a mixture of water and an organic solvent at alkaline pH, at elevated temperature and in the presence of at least one pigment dispersant selected from the group consisting of phthalocyaninesulfonic acids, phthalocyaninecarboxylic acids, phthalocyaninesulfonic salts, phthalocyaninecarboxylic salts and phthalocyaninesulfonamides.

The crude pigment used is a halogenated or halogen-free, metal-free or metal-atom-containing phthalocyanine, as obtained, for example, from synthesis. Metals can be, for example, Cu, Fe, Co, Zn, Sn, Cd, Ni, Ti or Al; preferably copper phthalocyanine is used. The phthalocyanine may be substituted by up to 16 halogen atoms, such as chlorine and bromine, for example. The phthalocyanines used may be in a variety of phases, examples being alpha, beta, gamma, delta or epsilon. It is preferred to use copper phthalocyanines which are halogen-free or have only a low chlorine content, up to 6% for example, especially the copper phthalocyanines obtained from synthesis in the beta phase. Alpha-phase copper phthalocyanines used are preferably those having a chlorine content of up to 20%, examples being semichlorocopper phthalocyanine, monochlorocopper phthalocyanine or so-called tri-/tetrachlorocopper phthalocyanine. A mixture of different crude phthalocyanine pigments can also be used. The crude copper phthalocyanine pigment present immediately after the synthesis usually still contains up to about 35% of salts formed in the course of the synthesis. Commonly these salts originating from the synthesis are removed by means of an alkaline and/or acidic aqueous extraction. In the method of the invention it is possible to use both the crude pigment containing synthesis salt and the crude pigment which has been purified to remove the synthesis salt.

Dry grinding takes place with or without grinding assistants. Suitable grinding assistants include alkali metal salts or alkaline earth metal salts of inorganic acids, hydrochloric or sulfuric acid for example, or of organic acids having 1 to 4 carbon atoms, formic and acetic acid for example. Preferred salts are sodium formate, sodium acetate, calcium acetate, sodium chloride, potassium chloride, calcium chloride, sodium sulfate, aluminum sulfate or mixtures of these salts. The grinding assistants can be used in any desired amount: for example, in an amount of up to 5 times, based on the weight of the crude pigment. Larger amounts too can be used, but are uneconomic.

In the course of dry grinding it is possible to employ organic liquids in amounts of up to 15% by weight, for example, preferably up to 10% by weight, based on millbase, these amounts being such that the millbase still retains a free-flowing consistency. Examples of such liquids are alcohols having 1 to 10 carbon atoms, such as methanol, ethanol, n-propanol, isopropanol, butanols, such as n-butanol, isobutanol, tert-butanol, pentanols, such as n-pentanol, 2-methyl-2-butanol, hexanols, such as 2-methyl-2-pentanol, 3-methyl-3-pentanol, 2-methyl-2-hexanol, 3-ethyl-3-pentanol, octanols, such as 2,4,4-trimethyl-2-pentanol, and cyclohexanol; or glycols, such as ethylene glycol, di-, tri- or tetraethylene glycol, propylene glycol, di-, tri- or tetrapropylene glycol, sorbitol or glycerol; polyglycols, such as polyethylene or polypropylene glycols; ethers, such as methyl isobutyl ether, tetrahydrofuran, dimethoxyethane or dioxane; glycol ethers, such as monoalkyl ethers of ethylene or propylene glycol or diethylene glycol monoalkyl ethers, in which alkyl may be methyl, ethyl, propyl and butyl, examples being butyl glycols or methoxybutanol; polyethylene glycol monomethyl ether, particularly that having an average molar mass of 350 to 550 g/mol, and polyethylene glycol dimethyl ether, especially that having an average molar mass of 250 to 500 g/mol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; esters, such as carboxylic acid $C_1$-$C_6$ alkyl esters, such as butyl formate, ethyl acetate or propyl propionate; or carboxylic acid $C_1$-$C_6$ glycol esters; or glycol ether acetates, such as 1-methoxy-2-propyl acetate; or phthalic acid dialkyl esters or benzoic acid alkyl esters, such as benzoic acid $C_1$-$C_4$ alkyl esters or $C_1$-$C_{12}$ alkyl diesters of phthalic acid; cyclic esters, such as caprolactone; nitriles, such as acetonitrile, aliphatic or aromatic amines, such as dimethylaniline or diethylaniline, for example; unhalogenated or halogenated aliphatic hydrocarbons or aromatic hydrocarbons such as benzine, pinene, carbon tetrachloride, tri- or tetrachloroethylene, tetrachloroethanes, benzene or alkyl-, alkoxy-, nitro-, cyano- or halogen-substituted benzene, examples being toluene, xylenes, ethylbenzene, anisole, nitrobenzene, chlorobenzene, dichlorobenzenes, trichlorobenzenes, benzonitrile or bromobenzene; or other substituted aromatics, such as phenols, aminophenols, cresols, nitrophenols, phenoxyethanol or 2-phenylethanol; aromatic heterocycles, such as pyridine, morpholine, picoline or quinoline; 1,3-dimethyl-2-imidazolidinone; sulfones and sulfoxides, such as dimethyl sulfoxide and sulfolane; and mixtures of these organic liquids. It is preferred to use those which have crystallizing and/or phase-determining properties. Preference is given to using glycols and glycol ethers, such as ethylene glycol, diethylene glycol or butyl glycol, amines, such as aniline, diethylaniline, dimethylaniline, n-butylamine, o-toluidine or tallow fatty propylene diamine, for example, dimethylformamide, N-methylpyrrolidone, triethanolamine, toluene, xylene, cumene, mesitylene or octylbenzene.

In the course of dry grinding it is additionally possible to use acids as well in amounts of up to 15% by weight for example, preferably up to 10% by weight, based on millbase, these amounts being such that the millbase retains its free-flowing consistency. It is possible to use the acids known from the literature, examples being the acids recited in DE 28 51 752 or in EP 780 446. It is preferred to use phosphoric acid, formic acid, acetic acid, methanesulfonic acid, dodecylbenzenesulfonic acid and, in particular, sulfuric acid.

Dry grinding may take place conventionally on continuous or discontinuous roller or vibrator mills. Suitable grinding media include all those known in the literature, examples being balls, cylinders or rods in materials encompassing steel, porcelain, steatite, oxides, such as aluminum oxide or unstabilized or stabilized zirconium oxide, for example, mixed oxides, such as zirconium mixed oxide, for example, or glass, such as quartz glass, for example. Grinding may take place at temperatures up to 200° C., although commonly temperatures below 100° C. are employed. The residence time in the mill is guided by the desired requirement and by the quality of the crude pigment used and additionally depends to a considerable extent on the grinding equipment and on the shape and material of the grinding media employed. It can for example amount in the case of vibratory grinding to between 15 minutes and 25 hours, advantageously between 30 minutes and 15 hours, preferably between 30 minutes and 9 hours, and in the case of roller grinding to between 5 and 100 hours, advantageously between 8 and 50 hours, preferably between 10 and 30 hours.

If grinding assistants, organic liquids or acids have been used in the course of dry grinding they can be removed prior to the solvent treatment. This is particularly advisable when relatively large amounts of grinding assistants are used. To perform such removal the millbase is stirred with water to give an aqueous suspension and the additives are dissolved and separated from the prepigment by filtration. In the case of this treatment it has proven appropriate to set an acid pH by adding acid, hydrochloric or sulfuric acid for example. It is also possible to choose an alkaline pH in order, for example, to dissolve an acid that has been used. A further possibility is to dispense with the removal, particularly when small amounts of grinding assistants, organic liquids or acids are used. These components may also be dissolved by the water used for the finish, and/or neutralized by means of a corresponding amount of base.

Wet grinding takes place in an inert liquid medium in a conventional continuous or discontinuous low-energy agitated ball mill operated with a power density at less than 2.5 kW per liter of grinding space and with a peripheral stirrer speed of less than 12 m/s, preferably less than 10 m/s, under the action of grinding media. Grinding media used are balls made for example of steel, porcelain, steatite, oxides, such as aluminum oxide, for example, or unstabilized or stabilized zirconium oxide, mixed oxides, such as zirconium mixed oxide, for example, or glass, such as quartz glass, for example, having a diameter of at least 0.3 mm, preferably at least 0.5 mm, in particular at least 1 mm. Separating the grinding media from the millbase takes place in the case of continuous agitated ball mills preferably by means of centrifugal deposition. A suitable liquid medium is an aqueous, aqueous-organic or organic medium, preferably aqueous or aqueous-organic. Suitable organic liquids include the solvents mentioned above that can also be employed for dry grinding, preferably $C_1$-$C_8$ alkanols such as methanol, ethanol, n-propanol, isopropanol, n-butanol, tert-butanol, isobutanol, pentanols, hexanols or alkylhexanols; cyclic alkanols such as cyclohexanol; $C_1$-$C_5$ dialkyl ketones such as acetone, diethyl ketone, methyl isobutyl ketone or methyl ethyl ketone; ethers and glycol ethers such as tetrahydrofuran, dimethoxyethane, methyl glycol, ethyl glycol, butyl glycol, ethyl diglycol, methoxypropanol or methoxybutanol; aliphatic acid amides such as formamide or dimethylformamide; cyclic carboxamides such as N-methylpyrrolidone, valerolactam or caprolactam; heterocyclic bases such as pyridine, morpholine or picoline; dimethyl sulfoxide; aromatic hydrocarbons such as toluene, xylenes or ethylbenzene; aromatic halogenated hydrocarbons such as chlorobenzene, o-dichlorobenzene, 1,2,4-trichlorobenzene or bromobenzene, and also substituted aromatics such as nitrobenzene or phenol. Use is made in particular of mixtures of these organic liquids with water.

In the case of an aqueous or aqueous-organic medium grinding can take place at any desired pH, preference being given to grinding at neutral or alkaline pH, it being necessary to take account of the pH stability when choosing an organic liquid.

The amount of solids in the millbase is dependent on the suspension rheology and is advantageously not more than 40% by weight, preferably 2.5% to 35% by weight, in particular 5% to 25% by weight, of the millbase suspension. Grinding is carried out at temperatures in the range from 0 to 100° C., advantageously between 10 and 60° C., preferably at 15 to 50° C.

The residence time of the millbase in the agitated ball mill is generally between 5 minutes and 5 hours, advantageously between 10 minutes and 2 hours.

The prepigment suspension formed can be used for the finish without interim isolation, but the prepigment can also be isolated beforehand. If desired, the organic liquid as well can be removed after wet grinding. This can be done, for example, given an appropriate choice of organic liquid, by means of steam distillation.

Salt kneading may take place in a manner known from the literature. The crude pigment is kneaded with an organic liquid and with salt in the form of a kneadable paste of high viscosity. Salts and organic liquids used can be the same as those mentioned in connection with dry grinding. The temperature during kneading should be above the melting point and below the boiling point of the organic liquid.

For salt kneading as well it is possible to use the acids mentioned above. Suitable kneaders include the known continuous and batch kneaders, preference being given to double-arm batch kneaders. In the case of salt kneading it is usual to use relatively large amounts of salt and organic liquid, and hence it is usual to remove them prior to the finish, by means for example of an aqueous extraction at acid pH.

Acid swelling describes a known treatment in the case of which the crude pigment is suspended in an acid at a concentration and in an amount that is sufficient to form salt but not to dissolve the crude pigment. Commonly for this purpose sulfuric acid with a strength of about 50% to 80% by weight, preferably about 60% to 80% by weight, is used, advantageously in an amount by weight of 3 to 15 times, based on crude pigment.

Acid pasting refers to the complete dissolution and precipitation of the crude pigment in suitable acids. Preference is given to using acids such as sulfuric acid, chlorosulfonic acid and polyphosphoric acids. The precipitation medium employed comprises water, organic solvents or mixtures thereof. Precipitation takes place preferably under turbulent flow conditions. If sulfuric acid is used its concentration should be greater than 90% by weight, custom being to use concentrated sulfuric acid at about 96% by weight or monohydrate. In general the amount of acid used is 2 to 20 times by weight, based on crude pigment.

Both after acid swelling and after acid pasting it is advantageous to isolate the prepigment prior to the finish, in order substantially to remove the acid.

The prepigment formed by the chosen method of fine division can be used in dry form or as a presscake for the finish, preference being given to its use in the form of a watery-moist presscake.

The solvent system used for the finish is composed of water, organic solvent and an amount of base necessary to set an alkaline pH.

Suitable organic solvents include the following: alcohols having 1 to 10 carbon atoms, such as methanol, ethanol, n-propanol, isopropanol, butanols, such as n-butanol, isobutanol, tert-butanol, pentanols, such as n-pentanol, 2-methyl-2-butanol, hexanols, such as 2-methyl-2-pentanol, 3-methyl-3-pentanol, 2-methyl-2-hexanol, 3-ethyl-3-pentanol, octanols, such as 2,4,4-trimethyl-2-pentanol, and cyclohexanol; or glycols, such as ethylene glycol, diethylene glycol, propylene glycol, propylene glycol, sorbitol or glycerol; polyglycols, such as polyethylene or polypropylene glycols; ethers, such as methyl isobutyl ether, tetrahydrofuran, dimethoxyethane or dioxane; glycol ethers, such as monoalkyl ethers of ethylene or propylene glycol or diethylene glycol monoalkyl ethers, in which alkyl may be methyl, ethyl, propyl and butyl, examples being butyl glycols or methoxybutanol; polyethylene glycol monomethyl ether, particularly that having an average molar mass of 350 to 550 g/mol, and polyethylene glycol dimethyl ether, especially that having an average molar mass of 250 to 500 g/mol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; nitriles, such as acetonitrile, aliphatic or aromatic amines, such as n-butylamine, for example; unhalogenated or halogenated aliphatic hydrocarbons or aromatic hydrocarbons such as cyclohexane, methylcyclohexane, methylene chloride, carbon tetrachloride, di-, tri- or tetrachloroethylene, di- or tetrachloroethanes or such as benzene or alkyl-, alkoxy-, nitro-, cyano- or halogen-substituted benzene, examples being toluene, xylenes, mesitylene, ethylbenzene, anisole, nitrobenzene, chlorobenzene, dichlorobenzenes, trichlorobenzenes, benzonitrile or bromobenzene; or other substituted aromatics, such as phenols, cresols, nitrophenols, such as o-nitrophenol, for example, phenoxyethanol or 2-phenylethanol; aromatic heterocycles, such as pyridine, morpholine, picoline or quinoline; 1,3-dimethyl-2-imidazolidinone; sulfones and sulfoxides, such as dimethyl sulfoxide and sulfolane; and mixtures of these organic solvents.

Preferred solvents are $C_1$-$C_6$ alcohols, especially methanol, ethanol, n- and isopropanol, isobutanol, n- and tert-butanol and tert-amyl alcohol; $C_3$-$C_6$ ketones, especially acetone, methyl ethyl ketone or diethyl ketone; tetrahydrofuran, dioxane, ethylene glycol, diethylene glycol or ethylene glycol $C_3$-$C_5$ alkyl ethers, especially 2-methoxyethanol, 2-ethoxyethanol, butyl glycol, toluene, xylene, ethylbenzene, chlorobenzene, o-dichlorobenzene, nitrobenzene, cyclohexane or methylcyclohexane.

In order to set an alkaline pH it is preferred as bases to use alkali metal and/or alkaline earth metal hydroxides, in the form where appropriate of their aqueous solutions, such as sodium or potassium hydroxide. Also conceivable are nitrogen-containing bases, such as ammonia or methylamine, for example.

In order to achieve the desired effect a pH of greater than or equal to 9.0 is advantageous, preferably a pH greater than or equal to 10, in particular a pH greater than or equal to 10.5. It is common to operate at a pH greater than or equal to 11.0. The base can also be used in large amounts of up to 20% by weight, preferably up to 15% by weight, in particular up to 10% by weight, based on the amount of water.

The weight ratio of water to organic solvent is 5:95 to 95:5, preferably 7.5: 92.5 to 92.5:7.5, in particular 10:90 to 90:10 and more preferably 20:80 to 80:20.

The total amount of water and organic solvent is in the range from 0.5 to 40, preferably from 1 to 20, in particular from 2 to 15, parts by weight per part by weight of pigment.

The solvent system may be a one-phase or two-phase system. It is preferred to use those organic solvents which are not completely miscible with water, and the finish is preferably carried out in a two-phase solvent system with an aqueous phase and an organic phase. The finish in the method of the invention can be carried out at a temperature of 50 to 250° C., particularly 70 to 200° C., in particular 100 to 190° C., and advantageously for a time of 5 minutes to 24 hours, particularly 5 minutes to 18 hours, in particular 5 minutes to 12 hours. Preferably the finish is carried out at boiling temperature, in particular at temperatures above the boiling point of the solvent system under superatmospheric pressure.

The pigment dispersants used in the method of the invention are known per se and are represented by the formula (I)

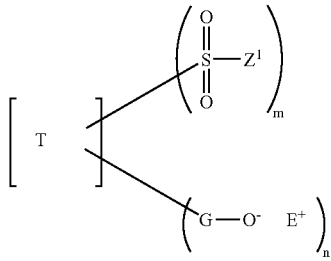

in which

T is a phthalocyanine radical which is either metal-free or contains a metal atom from the group Cu, Fe, Zn, Ni, Co, Al, Ti or Sn, especially Cu, and which is substituted by 1 to 4 chlorine atoms or preferably is chlorine-free;

m and n are identical or different and are a number from 0 to 4 with the proviso that the sum of m and n is a number from 1 to 4;

and in which the radical $Z^1$ is a radical of the formula (Ia)

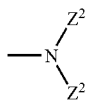

in which the two radicals $Z^2$ are identical or different and are a radical of the formula (Ib)

$$-[X-Y]_h-R^3 \qquad (Ib)$$

in which h is a number from 0 to 100, preferably 0 to 20, more preferably 0, 1, 2, 3, 4 or 5;

X is a $C_2$-$C_6$ alkylene radical, $C_5$-$C_7$ cycloalkylene radical, or a combination of these radicals, it being possible for these radicals to be substituted by 1 to 4 $C_1$-$C_4$ alkyl radicals, hydroxyl radicals, $C_1$-$C_4$ alkoxy radicals, ($C_1$-$C_4$)-hydroxyalkyl radicals and/or by 1 to 2 further $C_5$-$C_7$ cycloalkyl radicals, or in which X, if h is >1, can also be a combination of the stated definitions;

Y is an —O—,

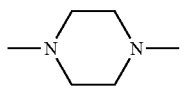

or a group —$NR^2$—, or in which Y, if h>1, can also be a combination of the stated definitions;

$R^2$ and $R^3$ independently of one another are a hydrogen atom, a substituted or unsubstituted, or partly fluorinated or perfluorinated, branched or unbranched $C_1$-$C_{20}$ alkyl group, a substituted or unsubstituted $C_5$-$C_8$ cycloalkyl group or a substituted or unsubstituted, or partly fluorinated or perfluorinated $C_2$-$C_{20}$ alkenyl group, it being possible for the substituents to be hydroxyl, phenyl, cyano, chlorine, bromine, amino, $C_2$-$C_4$ acyl or $C_1$-$C_4$ alkoxy and to be preferably 1 to 4 in number, or $R^2$ and $R^3$ together with the nitrogen atom of the $NR^2$ group form a saturated, unsaturated or aromatic heterocyclic 5- to 7-membered ring which if desired contains 1 or 2 further nitrogen, oxygen or sulfur atoms or carbonyl groups in the ring, is unsubstituted or substituted by 1, 2 or 3 radicals from the group OH, $NH_2$, phenyl, CN, Cl, Br, $C_1$-$C_4$ alkyl, $C_1$-$C_4$ alkoxy, $C_2$-$C_4$ acyl and carbamoyl, and if desired carries 1 or 2 benzo-fused saturated, unsaturated or aromatic, carbocyclic or heterocyclic rings;

or

Z is hydrogen, hydroxyl, amino, phenyl, ($C_1$-$C_4$)-alkylene-phenyl, $C_5$-$C_{30}$ cycloalkyl, $C_2$-$C_{30}$ alkenyl, or is branched or unbranched $C_1$-$C_{30}$ alkyl, it being possible for the phenyl ring, the ($C_1$-$C_4$)-alkylene-phenyl group, the $C_5$-$C_{30}$ cycloalkyl group, the $C_2$-$C_{30}$ alkenyl group and the $C_1$-$C_{30}$ alkyl group to be substituted by one or more, e.g., 1, 2, 3 or 4, substituents from the group Cl, Br, CN, $NH_2$, OH, $C_6H_5$, $C_6H_5$ substituted by 1, 2 or 3 $C_1$-$C_{20}$ alkoxy radicals, carbamoyl, carboxyl, $C_2$-$C_4$ acyl, $C_1$-$C_8$ alkyl, $NR^2R^3$, where $R^2$ and $R^3$ are as defined above, and $C_1$-$C_4$ alkoxy, e.g, methoxy or ethoxy, or for the alkyl group and the alkenyl group to be perfluorinated or partly fluorinated;

G is a divalent group —CO—, —$SO_2$—, —$SO_2N(R^6)$—$R^5$—CO—, —$SO_2N(R^6)$—$R^5$—$SO_2$—, —$CON(R^6)$—$R^5$—CO— or —$CON(R^6)$—$R^5$—$SO_2$—, and $R^5$ is a divalent branched or unbranched, saturated or unsaturated, aliphatic hydrocarbon radical having 1 to 20 carbon atoms, or a $C_5$-$C_7$ cycloalkylene radical, or a divalent aromatic radical having 1, 2 or 3, preferably 1 or 2, aromatic rings, it being possible for the rings to be in fused form or to be linked by a bond, such as, for example, a phenyl, biphenyl or naphthyl radical, or a heterocyclic radical having 1, 2 or 3 rings and containing 1, 2, 3 or 4 heteroatoms from the group O, N and S, or is a combination thereof; the aforementioned hydrocarbon, cycloalkylene, aromatic and heteroaromatic radicals can be substituted by 1, 2, 3 or 4 substituents from the group OH, CN, F, Cl, Br, $NO_2$, $CF_3$, $C_1$-$C_6$ alkoxy, S—$C_1$-$C_6$ alkyl, $NHCONH_2$, $NHC(NH)NH_2$, NHCO—$C_1$-$C_6$ alkyl, $C_1$-$C_6$ alkyl, $COOR^{20}$, $CONR^{20}R^{21}$, $NR^{20}R^{21}$, $SO_3R^{20}$ or $SO_2NR^{20}R^{21}$, $R^{20}$ and $R^{21}$ being identical or different and being hydrogen, phenyl or $C_1$-$C_6$ alkyl, and $R^6$ is hydrogen, $R^5$—H, $R^5$—$COO^-E^+$ or $R^5$—$SO_3^-E^+$; and $E^+$ is $H^+$;

the equivalent $M^{s+}$/s of a metal cation $M^{s+}$, preferably from main groups 1 to 5 or from transition groups 1 or 2 or 4 to 8 of the Periodic Table of the Chemical Elements, s being one of the numbers 1, 2 or 3, such as, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$;

a phosphonium ion; or an unsubstituted or substituted ammonium ion.

A suitable substituted ammonium ion is for example an ion of the formula $N^+R^9R^{10}R^{11}R^{12}$, where the substituents $R^9$, $R^{10}$, $R^{11}$ and $R^{12}$ are identical or different and have the definition of $Z^2$;

or where the substituents $R^9$ and $R^{10}$ together with the nitrogen atom of the ammonium ion can form a five- to seven-membered saturated or unsaturated ring system which if desired contains further heteroatoms from the group O, S and N or carbonyl groups, and which if desired carries 1 or 2 fused-on saturated, unsaturated or aromatic, carbocyclic or heterocyclic rings; the ring system and the rings fused on where appropriate can be substituted by 1, 2 or 3 radicals from the group OH, $NH_2$, phenyl, CN, Cl, Br, $C_1$-$C_4$ alkyl, $C_1$-$C_4$ alkoxy, $C_2$-$C_4$ acyl and carbamoyl, of the pyrrolidone, imidazolidine, hexamethyleneimine, piperidine, piperazine or morpholine type, for example;

or where the substituents $R^9$, $R^{10}$ and $R^{11}$ together with the nitrogen atom of the ammonium ion can form a five- to seven-membered aromatic ring system which if desired contains further heteroatoms from the group O, S and N or carbonyl groups, and which if desired carries 1 or 2 fused-on saturated, unsaturated or aromatic, carbocyclic or heterocyclic rings; the ring system and the rings fused on where appropriate can be substituted by 1, 2 or 3 radicals from the group OH, $NH_2$, phenyl, CN, Cl, Br, $C_1$-$C_4$ alkyl, $C_1$-$C_4$ alkoxy, $C_2$-$C_4$ acyl and carbamoyl, of the pyrrole, imidazole, pyridine, picoline, pyrazine, quinoline or isoquinoline type, for example.

Also suitable as substituted ammonium is the 1/p equivalent of an ammonium ion of the formula (Ic)

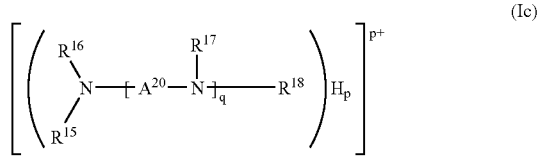

in which
$R^{15}$, $R^{16}$, $R^{17}$ and $R^{18}$ independently of one another are hydrogen or a (poly)alkyleneoxy group of the formula (Id);

in which j is the number 2 or 3, k is a number from 1 to 100, the radicals $R^{80}$ can be hydrogen, $C_1$-$C_4$ alkyl or, if k is >1, a combination thereof, and the radical $R^{81}$ is hydrogen, $C_1$-$C_4$ alkyl or the group $-(CH(R^{82})-)_iNH_2$, i is the number 2 or 3 and the radicals $R^{82}$ are hydrogen, $C_1$-$C_4$ alkyl or a combination thereof;

q is a number from 1 to 10, preferably 1, 2, 3, 4 or 5;
p is a number from 1 to 5, p being $\leq q+1$;
$A^{20}$ is a branched or unbranched $C_2$-$C_6$ alkylene radical; or in which $A^{20}$, if q is >1, can also be a combination of branched or unbranched $C_2$-$C_6$ alkylene radicals.

A further suitable substituted ammonium ion is an ammonium ion which derives from a polyaminoamido compound or polyamino compound and has a fraction of reactive polyamino groups such that the amine index is between 100 and 800 mg KOH per g of the polyaminoamido or polyamino compound, as disclosed for example in DE-A-27 39 775.

A further suitable substituted ammonium ion is a cation of a polymeric ammonium salt having an average molecular weight of 500 to 2 500 000 which is soluble in water or in $C_1$-$C_4$ alcohol, as disclosed for example in DE-A-42 14 868.

A further suitable substituted ammonium ion is the 1/r equivalent of a diamine-derived ammonium ion of the formula (III)

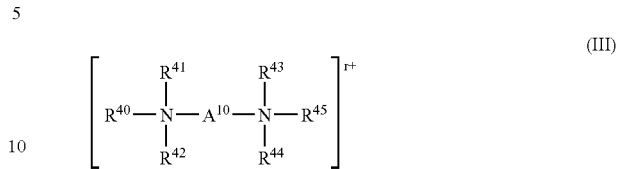

as disclosed for example in WO 01/14479
and in which
$R^{40}$ is $C_6$-$C_{30}$ alkyl, preferably linear $C_8$-$C_{20}$ alkyl, or $C_6$-$C_{30}$ alkenyl, preferably linear,
$R^{41}$ is a free valence, hydrogen, $C_1$-$C_{30}$ alkyl, $C_2$-$C_{30}$ alkenyl, $C_3$-$C_{30}$ cycloalkyl, $C_6$-$C_{14}$ aryl or $C_7$-$C_{38}$ aralkyl,
$R^{42}$, $R^{43}$ and $R^{45}$ are identical or different and are $C_1$-$C_6$ alkyl, preferably methyl, $C_3$-$C_{30}$ cycloalkyl, $C_6$-$C_{14}$ aryl or $C_7$-$C_{38}$ aralkyl,
$R^{44}$ is a free valence, hydrogen, $C_1$-$C_6$ alkyl, preferably methyl, $C_3$-$C_{30}$ cycloalkyl, $C_6$-$C_{14}$ aryl or $C_7$-$C_{38}$ aralkyl,
with the proviso that $R^{41}$ and $R^{44}$ are not simultaneously a free valence,
r is the number 2 or, where $R^{41}$ or $R^{44}$ is a free valence, is the number 1,
$A^{10}$ is $C_1$-$C_{12}$ alkylene or $C_2$-$C_{14}$ alkenylene, and contains preferably 2, 3 or 4 carbon atoms, in particular 3;
or
$R^{41}$ and $R^{43}$, together with the two nitrogen atoms to which they are attached and with $A^{10}$, form a ring, preferably piperazinyl; and/or
$R^{44}$ and $R^{45}$, together with the nitrogen atom to which they are attached, form a ring, preferably piperidinyl, morpholinyl, piperazinyl or N—($C_1$-$C_6$ alkyl)piperazinyl.

The radicals identified in the definition of $R^{40}$ to $R^{45}$ are preferably unsubstituted or are substituted by substituents from the group OH, $C_1$-$C_6$ alkyl, preferably methyl, $C_1$-$C_6$ alkoxy, CN and halogen, especially chlorine or bromine.

Aryl is preferably phenyl, aralkyl is preferably benzyl or 2-phenylethyl, and cycloalkyl is preferably cyclopentyl or cyclohexyl.

Preferred ions of the formula (III) are those in which $R^{41}$ and $R^{44}$ are hydrogen and $R^{42}$, $R^{43}$ and $R^{45}$ are methyl, more preferably those ions of the formula (III) in which $R^{41}$ to $R^{45}$ are methyl. Preference is further give to those ions of the formula (III) which derive from amines of natural oils and fats, such as coconut oil, corn oil, cereal oil, train oil or sperm oil, particularly from tallow fat.

Of particular interest are pigment dispersants of the formula (I) in which T is an unchlorinated copper phthalocyanine radical.

Pigment dispersants of the formula (I) where m is 1, 2 or 3 and n=0, and also pigment dispersants of the formula (I) where m is 0, n is 1, 2 or 3 and G is $-SO_2-$, are of interest.

Also of interest are pigment dispersants of the formula (I) in which
$R^2$ and $R^3$ are identical or different and are hydrogen, a $C_1$-$C_6$ alkyl group, especially methyl, ethyl, propyl, butyl or cyclohexyl, or a $C_1$-$C_6$ alkyl group substituted by 1 to 2 substituents from the group hydroxyl, acetyl, methoxy, ethoxy, chlorine and bromine.

Also of interest are pigment dispersants of the formula (I) in which —NR²— and R³ together form an imidazolyl, imidazolinyl, piperidinyl, morpholinyl, pipecolinyl, pyrrolyl, pyrrolidinyl, pyrazolyl, pyrrolidinonyl, indolyl, hexamethyleneiminyl or piperazinyl ring.

Also of interest are pigment dispersants of the formula (I) in which X is a $C_2$-$C_4$ alkylene radical or cyclohexylene.

Of particular interest are pigment dispersants of the formula (I) in which $Z^2$ has the definition —[(CH$_2$)$_3$—NH]$_2$—H, —(CH$_2$—CH$_2$—NH)$_2$H, —(CH$_2$)$_3$—NH—(CH$_2$)$_2$—NH—(CH$_2$)$_3$—NH$_2$,

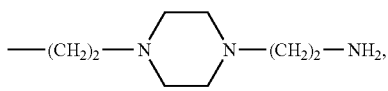

—(CH$_2$)$_3$—N(CH$_3$)—(CH$_2$)$_3$—NH$_2$, —(CH$_2$)$_3$—O—(CH$_2$)$_2$—O—(CH$_2$)$_3$—NH$_2$, —(CH$_2$)$_3$—O—(CH$_2$)$_3$—NH$_2$, —(CH$_2$)$_2$—NH—(CH$_2$)$_3$—NH$_2$, —(CH$_2$)$_3$—NH—(CH$_2$)$_2$—NH$_2$, —(CH$_2$—CH$_2$—NH)$_3$—H, —(CH$_2$—CH$_2$—NH)$_4$—H, —(CH$_2$—CH$_2$—NH)$_5$—H, —(CH$_2$)$_3$—O—(CH$_2$)$_2$—O—(CH$_2$)$_2$—O—(CH$_2$)$_3$—NH$_2$, —(CH$_2$)$_3$—O—(CH$_2$)$_4$—O—(CH$_2$)$_3$—NH$_2$,

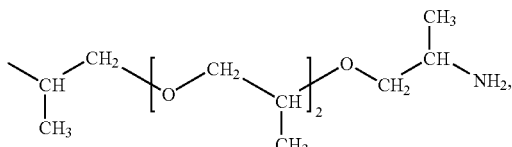

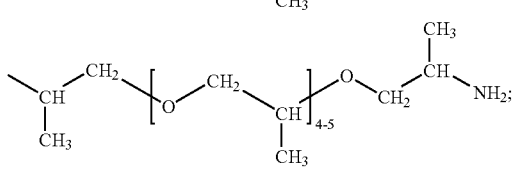

—(CH$_2$)$_2$—OH, —(CH$_2$)$_3$—OH, —CH$_2$—CH(CH$_3$)—OH, —CH(CH$_2$—CH$_3$)CH$_2$—OH, —CH(CH$_2$OH)$_2$, —(CH$_2$)$_2$—O—(CH$_2$)$_2$—OH or —(CH$_2$)$_3$—O—(CH$_2$)$_2$—O—(CH$_2$)$_2$—OH; —(CH$_2$)$_2$—NH$_2$, —(CH$_2$)$_3$—NH$_2$, —CH$_2$—CH(CH$_3$)—NH$_2$,

—CH$_2$—C(CH$_3$)$_2$—CH$_2$—NH$_2$,

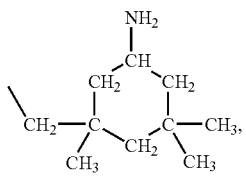

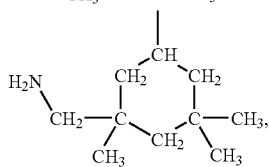

—(CH$_2$)$_2$—NH—CH$_3$, —(CH$_2$)$_2$—N(CH$_3$)$_2$, —(CH$_2$)$_2$—NH—CH$_2$—CH$_3$, —(CH$_2$)$_2$—N(CH$_2$—CH$_3$)$_2$, —(CH$_2$)$_3$—NH—CH$_3$, —(CH$_2$)$_3$—N(CH$_3$)$_2$, —(CH$_2$)$_3$—NH—CH$_2$—CH$_3$ or —(CH$_2$)$_3$—N(CH$_2$—CH$_3$)$_2$.

Also of interest are pigment dispersants of the formula (I), in which $Z^2$ is hydrogen, amino, $C_1$-$C_8$ alkyl, phenyl, benzyl or a $C_2$-$C_8$ alkyl, phenyl or benzyl substituted by 1 to 2 substituents from the group —NR²R³, hydroxyl, acetyl, methoxy and ethoxy, more preferably hydrogen, dimethylaminophenyl, diethylaminophenyl, methyl, ethyl, propyl, butyl, cyclohexyl, benzyl, hydroxyethyl, hydroxypropyl or methoxypropyl.

Also of particular interest are pigment dispersants of the formula (I) in which E⁺ has the definition H⁺;

or where, in the case of the equivalent $M^{s+}$/s, the metal cation $M^{s+}$ has the definition Na⁺, Ca²⁺, Mg²⁺, Sr²⁺, Ba²⁺, Mn²⁺ or Al³⁺;

or where E⁺ is a protonated tertiary amine which has been obtained from oils and fats such as tallow, coconut oil, corn oil, cereal oil, train oil or sperm oil and is, for example, triisooctylamine, dimethyltallowamine, dimethylsoyaamine, dimethyloctadecylamine or hydrogenated monomethyl-di(tallowamine) or an alkoxylated derivative of a fatty amine, examples being tallowalkyldi(2-hydroxyethyl)amine, polyoxyethylene(5)tallowamine, polyoxyethylene(8)oleylamine, N,N',N'-tris(2-hydroxyethyl)-N-tallow-1,3-diaminopropane, N,N',N'-polyoxyethylene(12)-N-tallow-1,3-diaminopropane; or where E⁺ is a quaternary ammonium ion which is preferably derived from the amines or alkoxylated fatty amines obtained from oils and fats above, by way of example by methylation or by reaction with benzyl chloride, and, for example, stearylbenzyl- or cocoalkyl-dimethylbenzylammonium or -2,4-dichlorobenzylammonium, hexadecyl-, stearyl-, dodecyl- or cetyltrimethylammonium, dihydrogenated tallowalkyl-, dicocoalkyl- or distearyldimethylammonium, oleyl- or cocodi(2-hydroxyethyl)methylammonium, hydrogenated polyoxyethylene(15)tallowmethylammonium, N,N,N',N',N'-pentamethyl-N-tallow-1,3-propanediammonium, permethylated N-stearyldiethylenetriamine, permethylated N-stearyltriethylenetetramine, N-(3-dodecyloxy-2-hydroxypropyl)octadecyldimethylammonium, methyltri(2-octyl)ammonium, N,N-di(beta-stearoylethyl)-N,N-dimethylammonium, laurylpyridinium, 2-hydroxy[5-chloro-, 5-isooctyl-, 5-t-butyl- or n-nonyl-]-1,3-xylylene-bispyridinium, 2-methoxy-5-isooctyl-1,3-xylylene-bispyridinium, 2-hydroxy-5-isooctyl-1,3-xylylene-bisquinolinium, 2-hydroxy-5-isooctyl-1,3-xylylene-bisisoquinolinium or behenyltrimethylammonium;

or where E⁺ is a phosphonium ion such as hexadecyltributylphosphonium, ethyltrioctylphosphonium or tetrabutylphosphonium;

it being possible for the original anions of the quaternary ammonium compounds or phosphonium compounds used to have been, for example, halide, sulfate, alkoxysulfate, alkoxyphosphate.

Further of particular interest are pigment dispersants of the formula (I) in which the amine on which the radical $Z^1$ or the ammonium ion N⁺R⁹R¹⁰R¹¹R¹² is based is a primary or secondary amine, especially mixtures of primary and secondary amines with unmixed or mixed hydrocarbon radicals of naturally occurring oils and fats such as tallow, coconut oil, corn oil, cereal oil, train oil or sperm oil, or wood resin; examples of specific compounds include ammonia, methylamine, triethylamine, butylamines, dibutylamines, tributylamine, hexylamines, dodecylamine, stearylamine, diethylamine, di-n-butylamine, ethylenediamine, aniline, N-methylaniline, benzylamine, phenylethylamine, cyclohexylaminoethylamine, 2 cyclohexylaminopropylamine, 3-stearylaminopropylamine, 2-dimethylaminoethylamine, 2-diethylaminoethylamine, 2-dipropylaminoethylamine, 2-dibutylaminoethylamine, 3-dimethylaminopropylamine, 3-diethylaminopropylamine, 3 cyclohexylaminopropylamine, N-methylpiperazine, N-aminopropylmorpholine, N-aminoethylpiperidine, N-aminoethylpyrrolidine, N-aminopropylpipecoline, 4-diethylamino-1-methylbut-1-ylamine, laurylamine, cocoamine or tallowamine, lauryl-, oleyl- or tallowpropylenediamine, tallowdipropylenetriamine, tallowtripropylenetetraamine, 1,1,3,3-tetramethylbutylamine, primary amines having tertiary $C_{16}$-$C_{22}$ alkyl groups, N,N-bisaminopropyltallowamine, 2-ethylhexoxypropylamine or dehydroabietylamine.

In the method of the invention it is common to use two or more different dispersants from among these pigment dispersants, in a total amount of 0.1% to 25% by weight, preferably 0.5% to 20% by weight, in particular 1% to 17.5% by weight, based on the weight of the crude phthalocyanine pigment.

The phthalocyaninesulfonic or phthalocyaninecarboxylic salts can be prepared in situ, by means for example of adding the phthalocyanine acids and the substance containing the salt-forming counterion to a suspension of the prepigment. They can also be prepared separately by means for example of combining the parent phthalocyaninesulfonic or phthalocyaninecarboxylic acid with the substance containing the salt-forming counterion, in aqueous or organic solvent, with isolation where appropriate. They may also be formed as early as during the preparation of the parent acidic pigment dispersants. The addition of the free acids, of the pigment dispersants and of the substances containing the salt-forming counterions may also take place at different points in time in the method. The desired salt may also be formed by a metathesis: for example, from alkali metal salts of the acid of the pigment dispersant and from an amine or an ammonium salt.

The pigment dispersants used in accordance with the invention can be employed at any stage in the method, with the proviso that the addition takes place before the finish. If they are not added until during the finish, they must be present for at least 5 minutes during the finish. For this reason they may also be added to the synthesis of the crude phthalocyanine pigment or formed simultaneously during the synthesis of the crude pigment, by means for example of adding trimellitic acid. Also conceivable is their addition prior to grinding, to salt kneading, to acid pasting or to acid swelling. Preferably they are added immediately prior to the finish.

After the finish the pH can be lowered again. The formation of salts, for example, may be favored at an acidic pH, such as at a pH of 3 to 6.

In the case of organic solvents which can be separated from the aqueous phase by steam distillation it is appropriate to remove them in this way before the pigment preparation is isolated, particularly if recovery of the solvent used is desired.

The pigment preparations produced by the method of the invention can be isolated using the standard methods, for example by filtration, decanting or centrifugation. Solvents can also be removed by washing. The pigment preparations can be employed as preferably aqueous press cakes, but in general are dried, solid systems of free-flowing pulverulent consistency, or granules.

When producing the pigment preparations it is possible to use auxiliaries, such as, for example, further surfactants, further nonpigmentary and pigmentary dispersants, fillers, standardizers, resins, waxes, defoamers, antidust agents, extenders, shading colorants, preservatives, drying retarders, rheology control additives, wetting agents, antioxidants, UV absorbers, light stabilizers, or a combination thereof.

The auxiliaries can be added at any point in the process: for example, even before fine division, before the finish, or not until after the finish, or else by mixing in the dry state.

Suitable surfactants include anionic, or anion-active, cationic, or cation-active, and nonionic or amphoteric substances, or mixtures of these agents.

Examples of suitable anionic substances include fatty acid taurides, fatty acid N-methyltaurides, fatty acid isethionates, alkylphenylsulfonates, examples being dodecylbenzenesulfonic acid, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; the salts of these anionic substances and soaps, examples being alkali metal salts of fatty acids, naphthenic acids and resin acids, abietic acid for example, alkali-soluble resins, rosin-modified maleate resins for example, and condensation products based on cyanuric chloride, taurine, N,N'-diethylaminopropylamine and p-phenylenediamine. Preference is given to resin soaps, i.e., alkali metal salts of resin acids.

Examples of suitable cationic substances include quaternary ammonium salts, fatty amine oxalkylates, polyoxyalkyleneamines, oxalkylated polyamines, fatty amine polyglycol ethers, primary, secondary or tertiary amines, examples being alkyl amines, cycloalkylamines or cyclized alkylamines, especially fatty amines, diamines and polyamines derived from fatty amines or fatty alcohols, and the oxalkylates of said amines, imidazolines derived from fatty acids, polyaminoamido or polyamino compounds or resins having an amine index of between 100 and 800 mg KOH per g of the polyaminoamido or polyamino compound, and salts of these cationic substances, such as acetates or chlorides, for example. Examples of suitable nonionic and amphoteric substances include fatty amine carboxyglycinates, amine oxides, fatty alcohol polyglycol ethers, fatty acid polyglycol esters, betaines, such as fatty acid amide N-propyl betaines, phosphoric esters of aliphatic and aromatic alchols, fatty alcohols or fatty alcohol polyglycol ethers, fatty acid amide ethoxylates, fatty alcohol-alkylene oxide adducts and alkylphenyl polyglycol ethers.

It is also possible to carry out the finish in an emulsion comprising water, surfactant and organic solvent.

By nonpigmentary dispersants are meant substances which structurally are not derived from organic pigments. They are added as dispersants either during the actual preparation of pigments, but often, also, during the incorporation of the pigments into the application media that are to be colored: for example, during the preparation of paints or printing inks, by dispersing the pigments into the corresponding binders. They may be polymeric substances, examples being polyolefins, polyesters, polyethers, polyamides, polyimines, polyacrylates, polyisocyanates, block copolymers thereof, copolymers of the corresponding monomers, or polymers of one class modified with a few monomers from a different class. These polymeric substances carry polar anchor groups such as, for example, hydroxyl, amino, imino and ammonium groups, carboxylic acid and carboxylate groups, sulfonic acid and sulfonate groups or phosphonic acid and phosphonate groups, and may also have been modified with aromatic, nonpigmentary substances. Nonpigmentary dispersants may additionally also be aromatic substances modified chemically with functional groups and not derived from organic pigments. Nonpigmenary dispersants of this kind are known to the skilled worker and in some cases are available commercially (e.g., Solsperse®, Avecia; Disperbyk®, Byk-Chemie; Efka®, Efka). A number of types will be named below, by way of representation, although in principle any desired other substances described can be employed, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids and carboxylic esters, urethane-containing polymers of ethylenically unsaturated monomers, urethane-modified polyesters, condensation products based on cyanuric halides, polymers containing nitroxile compounds, polyester amides, modified polyamides, modified acrylic polymers, dispersants with a comblike structure comprising polyesters and acrylic polymers, phosphoric esters, triazine-derived polymers, modified polyethers, or dispersants derived from aromatic, nonpigmentary substances. These parent structures are in many cases modified further, by means for example of chemical reaction with further substances carrying functional groups, or by means of salt formation.

By pigmentary dispersants are meant pigment dispersants which derive from an organic pigment parent structure and are prepared by chemically modifying said structure, examples being saccharine-containing pigment dispersants, piperidyl-containing pigment dispersants, naphthalene- or perylene-derived pigment dispersants, pigment dispersants having functional groups which are attached to the pigment structure via a methylene group, pigment structures chemically modified with polymers, pigment dispersants containing sulfo acid, sulfonamide or sulfo acid ester groups, pigment dispersants containing ether or thioether groups, or pigment dispersants containing carboxylic acid, carboxylic ester or carboxamide groups.

Further pigment dispersants are, in particular, those based on copper phthalocyanine of the formula (II)

(II)

in which
T is as defined above,
g is a number from 1 to 4, and
$A^1$ is a group of the formula (IIa)

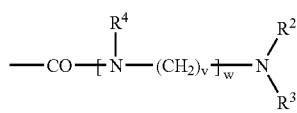
(IIa)

in which
$R^2$ and $R^3$ are as defined above, preferably hydrogen or $C_1$-$C_4$ alkyl,
$R^4$ is hydrogen, $C_1$-$C_4$ alkyl, preferably hydrogen or methyl,
v is a number from 1 to 6, preferably 2 or 3,
w is a number 0 or 1, preferably 1;

or in which
T is as defined above,
g is a number from 1 to 6, preferably 2 to 4, and
$A^1$ is an aminomethylene group of the formula (IIb)

(IIb)

in which
$R^2$ and $R^3$ are as defined above, preferably hydrogen or $C_1$-$C_4$ alkyl, or in which
T is as defined above,
g is a number from 1 to 4, and
$A^1$ is a group of the formula (IIc)

(IIc)

in which
A is a five- or six-membered aromatic ring or a fused aromatic heterocycle which contains 1 to 3 identical or different heteroatoms from the group nitrogen, oxygen and sulfur, and the heterocycle is attached via a carbon atom to the methylene group,
$R^{51}$ and $R^{52}$ are identical or different and are a hydrogen atom, a $C_1$-$C_4$ alkyl, a $C_1$-$C_4$ hydroxyalkyl or a $C_2$-$C_4$ alkenyl group, preferably hydrogen, methyl, ethyl or hydroxyethyl, or an aryl group, aryl being phenyl which is unsubstituted or substituted by 1 to 4 radicals from the group $C_1$-$C_6$ alkyl, halogen, preferably F, Cl or Br, $C_1$-$C_6$ alkoxy, cyano, $CONH_2$ and $COOR^{54}$, where $R^{54}$ is hydrogen or $C_1$-$C_6$ alkyl,
$R^{51}$ and $R^{52}$ may together also form an aliphatic or aromatic ring, preferably a phenyl ring,
$R^{53}$ is a hydrogen atom, a $C_1$-$C_4$ alkyl, a $C_1$-$C_4$ hydroxyalkyl or a $C_2$-$C_4$ alkenyl group;

or in which
T is as defined above,
g is a number from 1 to 4, and
$A^1$ is a group of the formula (IId)

(IId)

in which
t is a number from 3 to 6, preferably 3 to 5;
or in which
T is as defined above and if desired can be additionally substituted by 1, 2 or 3 sulfonic acid groups, g is a number from 1 to 4, preferably 1, 2 or 3, and
$A^1$ is a phthalimidomethylene group of the formula (IIe)

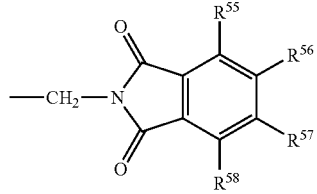

in which
$R^{55}$, $R^{57}$ and $R^{58}$ are identical or different and are hydrogen, fluorine, chlorine or bromine, preferably hydrogen,
$R^{56}$ is hydrogen, nitro, $C_1$-$C_5$ alkyl, $C_1$-$C_6$ alkoxy, benzoylamino, fluorine, chlorine or bromine, preferably hydrogen;

or in which
T is as defined above,
g is a number from 1 to 4, and
$A^1$ is an o-sulfobenzimidomethylene group of the formula (IIf)

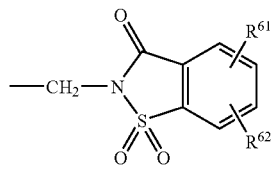

in which
$R^{61}$ and $R^{62}$ are identical or different and are hydrogen, chlorine, bromine, $C_1$-$C_4$ alkyl, $C_1$-$C_4$ alkoxy or nitro, preferably hydrogen;

or in which
T is as defined above,
g is a number from 1 to 4, and
$A^1$ is a group of the formula (IIg)

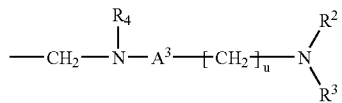

in which
$A^3$ is a carbonyl or sulfonyl group, preferably a carbonyl group,
$R^2$ and $R^3$ are as defined above,
$R^4$ is hydrogen, $C_1$-$C_4$ alkyl, preferably hydrogen and methyl;
u is the number 1 or 2, preferably 1.

Particular preference is given to pigment dispersants of the formula (II) in which $A^1$ is a phthalimidomethylene group of the formula (IIe), an imidazolylmethylene group of the formula (IIc) or an aminomethylene, an N-methylaminomethylene, an N,N-dimethylaminomethylene, an N-ethylaminomethylene or an N,N-diethylaminomethylene group of the formula (IIb).

Anionic groups of the nonpigmentary and pigmentary dispersants, surfactants or resins used as auxiliaries may also be laked, using for example Ca, Mg, Ba, Sr, Mn or Al ions or using quaternary ammonium ions. This may be done before or after the finish.

By fillers and/or extenders are meant a multiplicity of substances in accordance with DIN 55943 and DIN EN 971-1, examples being the various types of talc, kaolin, mica, dolomite, lime, barium sulfate or titanium dioxide. In this context it has proven particularly appropriate to make the addition before the grinding of the crude pigment or before the pulverization of the dried pigment preparation.

It has also proven appropriate to add small amounts of additives from the group consisting of phthalimide, phthalic anhydride, hydrogenated wood resin and glyceryl monooleate during grinding.

After the finish the suspension may further be subjected to a mechanical or thermal treatment, such as to dispersing by means of a bead mill or, preferably following removal of the solvent by steam distillation, to the addition of further auxiliaries or the aforementioned laking of anionic groups at elevated temperature.

The pigment preparations produced by the method of the invention can be employed for pigmenting high molecular weight organic materials of natural or synthetic origin, such as of plastics, resins, varnishes, paints or electrophotographic toners and developers, and also of inks, including printing inks, for example.

High molecular weight organic materials which can be pigmented with the pigment preparations produced by the method of the invention are, for example, cellulose ethers and cellulose esters, such as ethylcellulose, nitrocellulose, cellulose acetate or cellulose butyrate, natural resins or synthetic resins, such as addition-polymerization resins or condensation resins, examples being amino resins, especially urea- and melamine-formaldehyde resins, alkyde resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It is unimportant whether the aforementioned high molecular weight organic compounds are in the form of plastic masses, melts, or in the form of spinning solutions, varnishes, paints or printing inks. Depending on the intended use it proves advantageous to utilize the pigment preparations prepared in accordance with the method of the invention in the form of a blend or in the form of prepared products or dispersions. Based on the high molecular weight organic material that is to be pigmented, the pigment preparations produced by the method of the invention are used in an amount of 0.05% to 30% by weight, preferably 0.1% to 15% by weight.

The pigment preparations produced by the method of the invention are also suitable for use as colorants in electrophotographic toners and developers, such as, for example, one- or two-component powder toners (also called one- or two-component developers), magnetic toners, liquid toners, polymerization toners and specialty toners.

Typical toner binders are addition-polymerization resins, polyaddition resins and polycondensation resins, such as styrene, styrene-acrylate, styrene-butadiene, acrylate, polyester, phenolic-epoxy resins, polysulfones, polyurethanes, individually or in combination, and also polyethylene and polypropylene, which may also include further ingredients, such as charge control agents, waxes or flow assistants, or may be modified subsequently with these added ingredients.

The pigment preparations produced by the method of the invention are additionally suitable for use as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

As powder coating resins use is made typically of epoxy resins, carboxyl- and hydroxyl-containing polyester resins, polyurethane resins and acrylic resins, together with customary hardeners. Combinations of resins are also employed. For example, epoxy resins are frequently used in combination with carboxyl- and hydroxyl-containing polyester resins. Typical hardener components (depending on the resin system) are, for example, acid anhydrides, imidazoles, and also dicyandiamide and the derivatives thereof, masked isocyanates, bisacylurethanes, phenolic resins and melamine resins, triglycidyl isocyanurates, oxazolines and dicarboxylic acids.

Additionally the pigment preparations produced by the method of the invention are suitable for use as colorants in ink-jet inks, on both an aqueous and nonaqueous basis, and also in those inks which operate in accordance with the hot-melt process.

Ink-jet inks generally contain a total of 0.5% to 15% by weight, preferably 1.5% to 8% by weight (calculated on a dry basis), of one or more of the pigment preparations produced by the method of the invention.

Microemulsion inks are based on organic solvents, water and, if desired, an additional hydrotropic substance (interface mediator). Microemulsion inks generally contain 0.5% to 15% by weight, preferably 1.5% to 8% by weight, of one or more of the pigment preparations produced by the method of the invention, 5 to 99% by weight of water, and 0.5% to 94.5% by weight of organic solvent and/or hydrotropic compound.

Solvent-based ink-jet inks contain preferably 0.5% to 15% by weight of one or more of the pigment preparations produced by the method of the invention, 85% to 99.5% by weight of organic solvent and/or hydrotropic compounds.

Hot-melt inks are based mostly on waxes, fatty acids, fatty alcohols or sulfonamides which are solid at room temperature and liquefy on heating, the preferred melting range being between about 60° C. and about 140° C. Hot-melt ink-jet inks consist, for example, essentially of 20% to 90% by weight of wax and 1% to 10% by weight of one or more of the pigment preparations produced by the method of the invention. Additionally present may be 0% to 20% by weight of an additional polymer (as "dye dissolver"), 0% to 5% by weight of dispersing assistant, 0% to 20% by weight of viscosity modifier, 0% to 20% by weight of plasticizer, 0% to 10% by weight of tack additive, 0% to 10% by weight of transparency stabilizer (which prevents, for example, crystallization of the waxes), and 0% to 2% by weight of antioxidant.

Furthermore, the pigment preparations produced by the method of the invention are also suitable for use as colorants for color filters, for both additive and subtractive color generation, and also for electronic inks.

The method of the invention allows a multiplicity of high-value pigment preparations to be produced on the basis of different phthalocyanines and/or different crystal modifications by means of the targeted combination of the raw materials, method steps and method parameters. The method of the invention is particularly suitable for producing pigment preparations with copper phthalocyanine pigments of the beta phase and pigment preparations based on tri- and tetrachlorocopper phthalocyanines.

The pigment preparations produced by the method of the invention are notable for their outstanding coloristic and rheological properties, in particular their flocculation stability, dispersibility, rheology, gloss, transparency, and color strength. They can be dispersed easily and to high levels of fineness in many application media. Such pigment dispersions display outstanding rheological properties, even at high levels of pigmentation of the paint and printing ink concentrates. They can be used to give coatings and prints possessing high color strength, high gloss and high transparency and having excellent fastness properties.

In order to assess the properties of the pigments in the plastics field a selection was made, from among the multiplicity of known plastics, of plasticized polyvinyl chloride (PVC). The bleed fastness was determined in accordance with DIN 53775.

In order to assess the properties of the pigments in the coatings sector, in water-free, solvent-based coating systems, a selection was made, from among the multiplicity of known coating materials, of an alkyd-melamine resin varnish based on a medium-oil alkyd resin and a butanol-etherified melamine resin (AM), of a high-solids acrylic resin baking enamel based on a nonaqueous dispersion (HS), and of a polyester varnish (PE) based on cellulose acetobutyrate and a melamine resin.

In order to assess the properties of the pigments in the coatings sector in aqueous coating systems, a selection was made, from among the multiplicity of known coating systems, of an aqueous varnish based on polyurethane (PU).

In order to assess the properties of the pigments in the printing inks field a selection was made, from among the multiplicity of known printing systems, of a nitrocellulose-alcohol gravure system having a pigment concentration of 12% by weight pigment, based on millbase, during dispersing to give the printing ink concentrate (NC-A), of a nitrocellulose-alcohol gravure system having a high pigment concentration of 28% by weight pigment, based on millbase, during dispersing to give the printing ink concentrate (NC-A-HC), and of a nitrocellulose-ester gravure system having a pigment concentration of 12% by weight pigment, based on millbase, during dispersing to give the printing ink concentrate (NC-E).

The coloristic properties were determined in accordance with DIN 55986. The millbase rheology of the dispersion was evaluated visually on the basis of the following five-point scale.

5 highly fluid
4 liquid
3 viscous
2 slightly set
1 set

The overcoating fastness was determined in accordance with DIN 53221. The viscosity was determined, following dilution of the millbase to the final pigment concentration, using the Rossmann viscospatula type 301 from Erichsen.

In the examples below, percentages and parts are by weight, unless otherwise indicated.

EXAMPLE 1

A) Grinding and Acidic Suspension 550 parts of crude P. Blue 15 pigment, 550 parts of sodium sulfate and 120 parts of diethylene glycol are ground in a vibratory mill with iron rods for 90 minutes. The millbase is stirred in 4000 parts of 5% strength aqueous sulfuric acid at 90° C. for 2 h. The resulting suspension is filtered and washed salt-free with water. This gives 740.6 parts of 60.4% press-cake of the prepigment.

B) Finish 82.8 parts of 60.4% presscake, prepared according to example 1A), are suspended in 350 parts of tert-amyl alcohol and 283.5 parts of water. To the suspension there are added 15 parts of sodium hydroxide and 5 parts of copper phthalocyaninesulfonamide of the formula (Xa).

B) Comparative Example: Finish without Phthalocyaninesulfonic Acid

The experiment according to example 2A) is carried out with the sole difference that no phthalocyaninesulfonic acid is added. This gives 85 parts of phthalocyanine pigment.

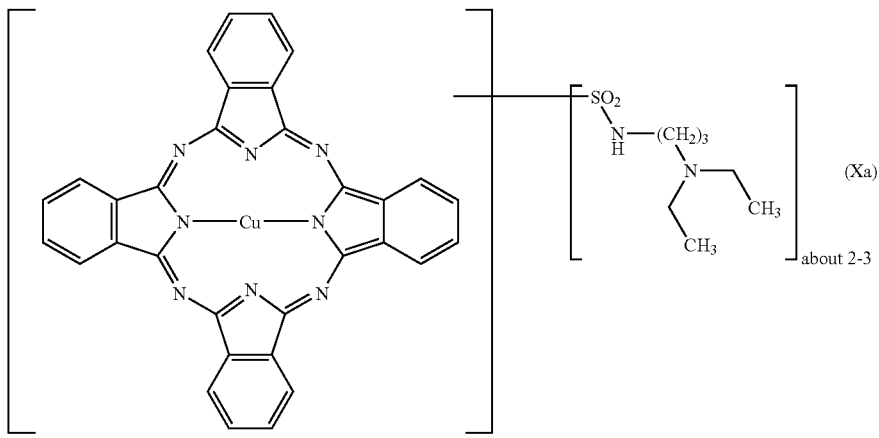

The suspension is stirred at 145° C. for 3 hours, the amyl alcohol is distilled off, the suspension is filtered, washing takes place with water, and the presscake is dried at 80° C. This gives 50.5 parts of phthalocyanine pigment preparation.

C) Finish: Comparative Example without Sodium Hydroxide Solution

The experiment according to example 1B) is carried out with the sole difference that no sodium hydroxide is added. This gives 52.6 parts of phthalocyanine pigment preparation.

D) Testing

The pigment preparation prepared according to example 1B) is compared with the pigment preparation prepared according to example 1C).

In the NC-A-HC printing system the pigment preparation from example 1B) is noticeably stronger in color and more transparent, the hue is markedly cleaner, and the print is noticeably glossier.

In the PU coating system the pigment preparation from example 1B) is substantially stronger in color, the hue is noticeably cleaner, and the metallic coating is substantially stronger in color and brighter.

In the AM varnish system the pigment preparation from example 1B) is significantly stronger in color and the hue is noticeably cleaner.

EXAMPLE 2

A) Finish 153.3 parts of 58.7% presscake, prepared according to example 1A), are suspended in 558 parts of isobutanol and 299.6 parts of water. 15.1 parts of sodium hydroxide and 13.9 parts of an aqueous 32.4% presscake of a copper phthalocyaninesulfonic acid having an average degree of substitution of 1.5 sulfonic acid groups per copper phthalocyanine radical are added and the mixture is heated to 150° C. It is stirred at 150° C. for 5 hours and then the isobutanol is distilled off, the resulting suspension is filtered and the presscake is washed salt-free and dried at 80° C. This gives 88 parts of phthalocyanine pigment preparation.

C) Comparative Example, Finish: Addition of Phthalocyaninesulfonic Acid Only after Removal of the Organic Solvent The experiment according to example 2A) is carried out with the sole difference that the phthalocyaninesulfonic acid is not added until after the distillative removal of the isobutanol and then the resulting aqueous suspension is stirred at boiling for 2 hours. This gives 87 parts of phthalocyanine pigment preparation.

D) Comparative Example, Finish: Addition of Phthalocyaninesulfonic Acid and Sodium Hydroxide Only after Removal of the Organic Solvent The experiment according to example 2A) is carried out with the sole difference that the phthalocyaninesulfonic acid and the sodium hydroxide are not added until after the distillative removal of the isobutanol and then the resulting aqueous suspension is stirred at boiling for 2 hours. This gives 86 parts of phthalocyanine pigment preparation.

E) Comparative Example, Finish: Addition of Sodium Hydroxide Only after Removal of the Organic Solvent The experiment according to example 2A) is carried out with the sole difference that the sodium hydroxide is not added until after the distillative removal of the isobutanol and then the resulting aqueous suspension is stirred at boiling for 2 hours. This gives 84.5 parts of phthalocyanine pigment preparation.

F) Testing

In PVC the pigment preparation from example 2A) gives strong greenish blue colorations which are very clean and possess very good bleed fastness.

In the AM varnish system the pigment preparation from example 2A) gives strong, transparent greenish blue colorations which are very clean, and the gloss measurement returns a value of 73.

In the NC-A system the pigment preparation from example 2A) gives strong, transparent, greenish blue and glossy colorations.

The pigment preparation from example 2A), in comparison to the pigment preparations from examples 2B), 2C), 2D) and 2E), is more strongly colored and cleaner in PVC, is mostly more strongly colored in the AM varnish system, and in the NC-A system is more strongly colored, more transparent and more glossy:

| Pig. prep. ex. 2A compared with | in PVC Color strength | in PVC Cleanness | in AM Color strengh |
|---|---|---|---|
| Ex. 2B | much stronger | noticeably cleaner | substantially stronger |
| Ex. 2C | much stronger | noticeably cleaner | substantially stronger |
| Ex. 2D | somewhat stronger | somewhat cleaner | much stronger |
| Ex. 2E | substantially stronger | substantially cleaner | of equal color strength |

| Pig. prep. ex. 2A compared with | in NC-A Color strength | in NC-A Transparency | in NC-A Gloss |
|---|---|---|---|
| Ex. 2B | substantially stronger | significantly more transparent | significantly glossier |
| Ex. 2C | substantially stronger | significantly more transparent | significantly glossier |
| Ex. 2D | much stronger | much more transparent | substantially glossier |
| Ex. 2E | somewhat stronger | noticeably more transparent | much glossier |

In the PE and PU varnish systems the pigment preparation from example 2A) gives strong, transparent, greenish blue colorations which are very clean, and the metallic coatings are strongly colored and bright.

In the PE varnish system the pigment preparation from example 2A), in comparison with the pigment preparations from examples 2B), 2C), 2D) and 2E), is stronger in color, mostly more transparent and cleaner, and the metallic is more strongly colored and brighter; in the PU varnish system the pigment preparation from example 2A), in comparison to the pigment preparations from examples 2B), 2C) and 2D), is likewise more strongly colored, more transparent and cleaner and the metallic is more strongly colored and brighter:

st.=more strongly colored, tra.=more transparent, hi.=more hiding, cl.=cleaner, brig.=brighter

| Pig. prep. ex. 2A compared with | in PE Color strength | in PE Transparency | in PE Cleanness | in PE Metallic |
|---|---|---|---|---|
| Ex. 2B | significantly st. | significantly tra. | significantly cl. | significantly st. & brig. |
| Ex. 2C | substantially st. | substantially tra. | much cl. | substantially st. & brig. |
| Ex. 2D | much st. | much tra. | noticeably cl | much st. & brig. |
| Ex. 2E | noticeably st. | somewhat hi. | somewhat cl. | much st. & brig. |

| Pig. prep. ex. 2A compared with | in PU Color strength | in PU Transparency | in PU Cleanness | in PU Metallic |
|---|---|---|---|---|
| Ex. 2B | substantially st. | much tra. | substantially cl. | substantially st. & brig. |
| Ex. 2C | substantially st. | much tra. | substantially cl. | substantially st. & brig. |
| Ex. 2D | much st. | somewhat tra. | noticeably cl. | Much st. & brig. |

G) Comparative Example: Finish without Sodium Hydroxide

The experiment according to example 2A) is carried out with the sole difference that no sodium hydroxide is added. This gives 90 parts of phthalocyanine pigment preparation.

This pigment preparation, in comparison to the pigment preparations from example 2A), is noticeably weaker in color, noticeably more hiding and much more matt in the NC-A system.

In the PE varnish system it is much more hiding, much weaker in color and significantly dirtier and the metallic coating is substantially weaker in color.

EXAMPLE 3

A) Finish 165.6 parts of 60.4% presscake, prepared according to example 1A), are suspended in 620 parts of tert-amyl alcohol and 350.2 parts of water.

4.2 parts of sodium hydroxide and 15.4 parts of aqueous 32.4% presscake of a copper phthalocyanine sulfonic acid having an average degree of substitution of 1.5 sulfonic acid groups per copper phthalocyanine radical are added and the mixture is heated to 150° C. It is stirred at 150° C. for 2 hours and then the amyl alcohol is distilled off, the resulting suspension is filtered and the presscake is washed salt-free. This gives 239 parts of 40.4% presscake of the phthalocyanine pigment preparation.

B) Drying 59 parts of a presscake prepared according to example 3A) are dried at 80° C. This gives 23.8 parts of phthalocyanine pigment preparation.

In the AM varnish system, strong, transparent greenish blue coatings are obtained, the rheology is evaluated as being 5, the gloss measurement returns a value of 77, and the viscosity is 4.0 sec.

In the PU varnish system the coatings are likewise strongly colored greenish blue and transparent, the overcoating fastness is very good, and the rheology is evaluated as being 3.

In the NC-A-HC printing system, strongly colored, transparent greenish blue prints are obtained with a high gloss, and the viscosity of the printing ink concentrate after dispersion is very low.

C) Aftertreatment 79.7 parts of a presscake prepared according to example 3A) are pasted in 250 parts of water and heated to 80° C. 7.7 parts of aqueous 32.4% presscake of a copper phthalocyaninesulfonic acid having an average degree of substitution of 1.5 sulfonic acid groups per copper phthalocyanine radical are added and the mixture is stirred at 80° C. for 1 hour. The resulting suspension is filtered and the presscake is washed and dried. This gives 32.6 parts of phthalocyanine pigment preparation.

In the AM varnish system, strong, transparent greenish blue coatings are obtained, the rheology is evaluated as being 5, the gloss measurement returns a value of 55, and the viscosity is 3.3 sec.

In the NC-A-HC printing system, strong, transparent greenish blue prints of high gloss are obtained, and the viscosity of the printing ink concentrate after dispersion is very low.

D) Aftertreatment 100.3 parts of a presscake prepared according to example 3A) are pasted in 300 parts of water. Following the addition of 1200 parts of glass beads with a diameter of 1 mm as grinding media, the suspension is introduced into an agitated ball mill with a disk stirrer (manufacturer: Draiswerke GmbH, Mannheim) and ground for 10 minutes with a peripheral speed of 10.2 m/s and a power density of 0.45 kW/l of grinding space at 20° C. Thereafter the grinding media are separated from the millbase by sieving, the millbase is filtered with suction and the solid product is washed with water and dried at 80° C.

This gives 38.3 parts of phthalocyanine pigment preparation.

In the AM varnish system, strong, transparent greenish blue coatings are obtained, the rheology is evaluated as being 5, the gloss measurement returns a value of 76, and the viscosity is 3.1 sec.

In the NC-A-HC printing system, strong, transparent greenish blue prints with a high gloss are obtained, and the viscosity of the printing ink concentrate after dispersion is very low.

E)

A presscake is prepared according to example 3A) with the sole difference that 15% by weight rather than 5% by weight, based on prepigment, of copper phthalocyaninesulfonic acid is added. Drying takes place according to example 3B). Prints are produced using the phthalocyanine pigment preparation in different printing ink systems:

In the NC-A-HC, NC-A and NC-E printing systems, strongly colored, transparent prints with a clean greenish blue hue and high gloss are obtained. The viscosity of the printing ink concentrate in the NC-A-HC system after dispersion is very low. The flocculation stability in the NC-E system is very good.

EXAMPLE 4

165.6 parts of 60.4% presscake prepared according to example 1A) are suspended in 300 parts of methyl ethyl ketone and 220 parts of water.

15 parts of sodium hydroxide, 24.7 parts of aqueous 32.4% presscake of a copper phthalocyaninesulfonic acid having an average degree of substitution of 1.5 sulfonic acid groups per copper phthalocyanine radical and 6 parts of a disproportionated rosin having an acid number of 150-160 are added and the mixture is heated to 120° C. It is stirred at 120° C. for 5 hours and then the methyl ethyl ketone is distilled off. After the system has cooled to 80° C., a solution of 15 parts of calcium chloride in 100 parts of water is added. The pH is adjusted to 10 using 31% strength hydrochloric acid and the suspension is stirred at 80° C. for 1 hour. It is filtered and the presscake is washed salt-free and dried at 80° C. This gives 105.6 parts of phthalocyanine pigment preparation.

In the AM varnish system, strong, transparent greenish blue coatings are obtained, the rheology is evaluated as being 5, the gloss measurement returns a value of 71, and the viscosity is 3.7 sec.

In the PU varnish system the coatings are likewise strongly colored, transparent and greenish blue, and the overcoating fastness is very good.

EXAMPLE 5

165.6 parts of 60.4% presscake prepared according to example 1A) are suspended in 240 parts of tert-amyl alcohol and 207.4 parts of water.

7 parts of sodium hydroxide, 24.7 parts of aqueous 32.4% presscake of a copper phthalocyaninesulfonic acid having an average degree of substitution of 1.5 sulfonic acid groups per copper phthalocyanine radical, 2 parts of N,N,N',N',N'-pentamethyl-N-tallow-1,3-propanediammonium dichloride in 50% form and 3 parts of cocoalkyldimethylbenzylammonium chloride in 50% form are added and the mixture is heated to 170° C. It is stirred at 170° C. for 30 minutes and then the tert-amyl alcohol is distilled off. The resulting suspension is filtered and the presscake is washed salt-free and dried at 80° C. This gives 99.2 parts of phthalocyanine pigment preparation.

In the AM varnish system, strong, transparent greenish blue coatings are obtained, the rheology is evaluated as being 5, the gloss measurement returns a value of 77, and the viscosity is 3.8 sec.

In the PU varnish system the coatings are likewise strongly colored, transparent and greenish blue, and the overcoating fastness is very good.

EXAMPLE 6

A) Grinding and Acidic Suspension 30 parts of crude P. Blue 15 pigment, 90 parts of sodium chloride and 3.5 parts of butyl glycol are ground in a vibratory mill with 10 to 15 mm steel cylpebs for 4 hours. The millbase is stirred in 440 parts of 5% strength aqueous sulfuric acid at 90° C. for 2 h. The resulting suspension is filtered and the solid product washed salt-free with water. This gives 76 parts of 36.9% presscake of the prepigment.

B) Finish 76 parts of 36.9% presscake, prepared according to example 6A), are suspended in 149 parts of isobutanol and 149 parts of water. 9.2 parts of aqueous 27.4% presscake of a copper phthalocyaninesulfonic acid having an average degree of substitution of 1.3 sulfonic acid groups per copper phthalocyanine radical, 0.65 part of tallowpropylenediamine and 0.28 part of fatty cocoamine are added. The pH is adjusted to 11.8 using about 1.8 parts of 33% strength sodium hydroxide solution and then the mixture is heated to 140° C. It is stirred at 140° C. for 5 hours and then the isobutanol is distilled off. The resulting suspension is filtered and the presscake is washed salt-free and dried at 80° C. This gives 29.2 parts of phthalocyanine pigment preparation.

In the AM varnish system, strong, transparent greenish blue coatings are obtained, the rheology is evaluated as being 5, the gloss measurement returns a value of 64, the viscosity is 3.7 sec, and the overcoating fastness is very good.

EXAMPLE 7

A) Grinding and Acidic Suspension 30 parts of crude P. Blue 15 pigment, 10 parts of aluminum sulfate hydrate and 1 part of butyl glycol are ground in a vibratory mill with 10 to 15 mm steel cylpebs for 4 hours. The millbase is stirred in 160 parts of 5% strength aqueous sulfuric acid at 90° C. for 2 h. The resulting suspension is filtered and the solid product washed salt-free with water. This gives 50.6 parts of 56.7% presscake of the prepigment.

B) Finish 47.3 parts of 56.7% presscake, prepared according to example 7A), are suspended in 375 parts of tert-amyl alcohol and 137.1 parts of water. 3.2 parts of sodium hydroxide, 7.1 parts of aqueous 32.4% presscake of a copper phthalocyaninesulfonic acid having an average degree of substitution of 1.5 sulfonic acid groups per copper phthalocyanine radical, 0.62 part of N,N-bisaminopropyltallowamine, 0.62 part of stabilized abietylamine and 0.45 part of a disproportionated rosin having an acid number of 150-160 are added. Then the mixture is heated to 145° C. It is stirred at 145° C. for 2 hours and then the tert-amyl alcohol is distilled off. The resulting suspension is filtered and the presscake is washed salt-free and dried at 80° C. This gives 27.5 parts of phthalocyanine pigment preparation.

In the AM varnish system, strong, transparent greenish blue coatings are obtained, and the overcoating fastness is very good.

EXAMPLE 8

164.9 parts of 60.6% presscake prepared according to example 1A) are suspended in 240 parts of methyl ethyl ketone and 208.1 parts of water.

7 parts of sodium hydroxide, 37 parts of aqueous 32.4% presscake of a copper phthalocyaninesulfonic acid having an average degree of substitution of 1.5 sulfonic acid groups per copper phthalocyanine radical, 2 parts of N,N',N'-polyoxyethylene(12)-N-tallow-1,3-diaminopropane and 2 parts of oleylamine which has been reacted with an 8-fold excess of ethylene oxide are added. Then the mixture is heated to 110° C. It is stirred at 110° C. for 9 hours. The methyl ethyl ketone is distilled off, the resulting suspension is filtered and the presscake is washed salt-free and dried at 80° C. This gives 104.4 parts of phthalocyanine pigment preparation.

In the PU varnish system, strong, transparent greenish blue coatings are obtained, the metallic is strongly colored and bright, and the overcoating fastness is very good.

EXAMPLE 9

164.9 parts of 60.6% presscake prepared according to example 1A) are suspended in 130 parts of tert-amyl alcohol and 305.6 parts of water.

19.5 parts of sodium hydroxide, 27.4 parts of aqueous 27.4% presscake of a copper phthalocyaninesulfonic acid having an average degree of substitution of 1.3 sulfonic acid groups per copper phthalocyanine radical, 3.2 parts of cocodi (2-hydroxyethyl)methylammonium chloride in 77% form and 2 parts of hydrogenated polyoxyethylene(15)tallowmethylammonium chloride are added. Then the mixture is heated to 125° C. It is stirred at 125° C. for 6 hours. The tert-amyl alcohol is distilled off, the resulting suspension is filtered and the presscake is washed salt-free and dried at 80° C. This gives 106.3 parts of phthalocyanine pigment preparation.

In the PU varnish system, strong, transparent greenish blue coatings are obtained, the metallic is strongly colored and bright, and the overcoating fastness is very good.

EXAMPLE 10

164.9 parts of 60.6% presscake prepared according to example 1A) are suspended in 240 parts of isobutanol and 208.1 parts of water. 7 parts of sodium hydroxide, 30.8 parts of aqueous 32.4% presscake of a copper phthalocyaninesulfonic acid having an average degree of substitution of 1.5 sulfonic acid groups per copper phthalocyanine radical, 7 parts of hexadecyltrimethylammonium chloride in 30% form and 4 parts of rosin which has been modified with maleic anhydride and fumaric acid and has an acid number of about 260 are added. Then the mixture is heated to 135° C. It is stirred at 135° C. for 3 hours. The isobutanol is distilled off, the resulting suspension is filtered and the presscake is washed salt-free and dried at 80° C. This gives 105 parts of phthalocyanine pigment preparation.

In the AM varnish system, strong, transparent greenish blue coatings are obtained, the rheology is evaluated as being 5, the gloss measurement returns a value of 82, the viscosity is 3.5 sec, and the overcoating fastness is very good.

In the PU varnish system, strong, transparent greenish blue coatings are obtained, the metallic is strongly colored and bright, and the overcoating fastness is very good.

EXAMPLE 11

A) Fine Division by Acid Pasting 200 parts of crude tri-/tetrachlorophthalocyanine blue are dissolved in 2000 parts of 95-98% strength sulfuric acid. The solution is poured onto a mixture of 5000 parts of ice and 5000 parts of water. After heating to 80° C. the system is stirred at 80° C. for 30 minutes and then the resulting suspension is filtered and the presscake is washed salt-free with water. This gives 945 parts of 20.3% presscake.

B) Finish 246 parts of 20.3% presscake, prepared according to example 2A), are suspended in 330 parts of tert-amyl alcohol and 120.8 parts of water. Following the addition of 13.2 parts of sodium hydroxide, 5 parts of hexadecyltrimethylammonium chloride in 30% form and 15.4 parts of aqueous 32.4% presscake of a copper phthalocyaninesulfonic acid having an average degree of substitution of 1.5 sulfonic acid groups per copper phthalocyanine radical, the suspension is heated to 130° C. and stirred at 130° C. for 3 hours. After it has cooled, the amyl alcohol is distilled off, the resulting suspension is filtered and the presscake is washed and dried at 80° C. This gives 50.8 parts of phthalocyanine pigment preparation.

In the HS, PU and PE varnish systems, strong, transparent, greenish blue and glossy coatings with a clean hue are obtained, and the metallic coatings are strongly colored and bright. The gloss value measured in the PE varnish system on cast films is 10.

C) Finish: Comparative Example without Sodium Hydroxide

The experiment according to example 11B) is carried out with the sole difference that no sodium hydroxide is added. This gives 50 parts of phthalocyanine pigment preparation.

In the PE varnish system the coatings, compared with example 11B), are much more hiding, much weaker in color and much dirtier, the gloss value measured on cast films is only 2, and the metallic coating is substantially weaker in color with a pallid hue.

D) Finish: Comparative Example without Sodium Hydroxide and without Copper Phthalocyaninesulfonic Acid Salt The experiment according to example 11B) is carried out with the sole difference that no sodium hydroxide, no phthalocyaninesulfonic acid and no ammonium chloride compound are added. This gives 37 parts of phthalocyanine pigment.

In the PE varnish system the coatings, compared with example 11B), are noticeably more hiding, noticeably weaker in color and noticeably dirtier, the gloss value measured on cast films is only 4, and the metallic coating is substantially weaker in color with a pallid hue.

What is claimed is:

1. A method for the production of a phthalocyanine pigment preparation, comprising the steps of finely dividing a crude phthalocyanine pigment by a method selected from the group consisting of dry grinding, wet grinding, salt kneading, acid pasting and acid swelling to form a prepigment and subjecting the prepigment to a finish treatment in a mixture of water and an organic solvent at alkaline pH, at a temperature between 50° and 250° C. and in the presence of at least one pigment dispersant selected from the group consisting of phthalocyaninesulfonic acids, phthalocyaninecarboxylic acids, phthalocyaninesulfonic salts, phthalocyaninecarboxylic salts and phthalocyaninesulfonamides.

2. The method as claimed in claim 1, wherein the crude phthalocyanine pigment is halogen-free or is substituted by up to 16 halogen atoms.

3. The method as claimed in claim 1, wherein the crude phthalocyanine pigment is a copper phthalocyanine.

4. The method as claimed in claim 1, wherein the organic solvent is selected from the group consisting of $C_1$-$C_{10}$ alcohols, glycols, polyglycols, ethers, glycol ethers, ketones, aliphatic acid amides, urea derivatives, cyclic carboxamides, nitriles, aliphatic amines, aromatic amines, chlorinated aliphatic hydocarbons, aromatic hydrocarbons, substituted aromatics, aromatic heterocycles, sulfones sulfoxides, and mixtures thereof.

5. The method as claimed in one claim 1, wherein the finish treatment is carried out at a pH of greater than or equal to 9.

6. The method as claimed in claim 1, wherein water and organic solvent have a weight ratio and wherein the weight ratio of water to organic solvent is 5:95 to 95:5.

7. The method as claimed in claim 1, wherein 0.5 to 40 parts by weight of the mixture of water and organic solvent are used per part by weight of crude phthalocyanine pigment.

8. The method as claimed in one claim 1, wherein the finish treatment is carried out at a temperature of 100° to 190° C.

9. The method as claimed in claim 1, wherein the pigment dispersant is a compound of the formula (I)

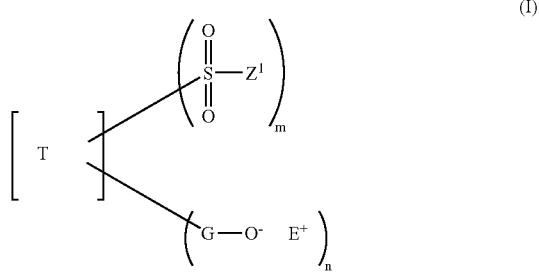

(I)

wherein
T is a phthalocyanine radical which is either metal-free or contains a metal atom selected from the group consisting of Cu, Fe, Zn, Ni, Co, Al, Ti and Sn, and wherein the phthalocyanine radical is substituted by 1 to 4 chlorine atoms or is chlorine-free;

m and n are identical or different and are a number from 0 to 4 with the proviso that the sum of m and n is a number from 1 to 4;

and wherein the radical $Z^1$ is a radical of the formula (Ia)

(Ia)

wherein the two radicals $Z^2$ are identical or different and are a radical of the formula (Ib)

—[X—Y]$_h$—$R^3$ (Ib)

wherein
h is a number from 0 to 100;

X is a $C_2$-$C_6$ alkylene radical, $C_5$-$C_7$ cycloalkylene radical, or a combination thereof, wherein the $C_2$-$C_6$ alkylene radical, $C_5$-$C_7$ cycloalkylene radical, or combination thereof is, optionally, substituted by 1 to 4 $C_1$-$C_4$ alkyl radicals, hydroxyl radicals, $C_1$-$C_4$ alkoxy radicals, ($C_1$-$C_4$)-hydroxyalkyl radicals, 1to 2 further $C_5$-$C_7$ cycloalkyl radicals, or, if h is>1, the $C_2$-$C_6$ alkylene radical, $C_5$-C7 cycloalkylene radical, or combination thereofis, optionally, substituted by a combination 1 to 4 $C_1$-$C_4$ alkyl radicals, hydroxyl radicals, $C_1$-$C_4$ alkoxy radicals, ($C_1$-$C_4$)-hydroxyalkyl radicals, or 1 to 2 further $c_5$-$C_7$ cycloalkyl radicals;

Y is an —O—,

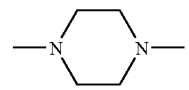

or a group —$NR^2$—, or wherein Y, if h>1, is, optionally, a combination of

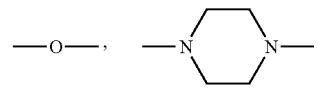

and a group —NR—$^2$;

$R^2$ and $R^3$ independently of one another are a hydrogen atom, a substituted or unsubstituted, or partly fluorinated or perfiucrinated, branched or unbranched $C_1$-$C_{20}$ alkyl group, a substituted or unsubstituted $C_5$-$C_8$ cycloalkyl group or a substituted or unsubstituted, or partly fluorinated or perfluorinated $C_2$-$C_{20}$ alkenyl group, or $R^2$ and $R^3$ together with the nitrogen atom of the $NR^2$ group form a saturated, unsaturated or aromatic heterocyclic 5- to 7-membered ring optionally containing 1 or 2 further nitrogen, oxygen or sulfur atoms or carbonyl groups in the ring, wherein the saturated, unsaturated or aromatic heterocyclic 5- to 7-membered ring is unsubstituted or substituted by 1, 2 or 3 radicals selected from the group consisting of OH, $NH_2$, phenyl, CN, Cl, Br, $C_1$-$C_4$alkyl, $C_1$-$C_4$ alkoxy, $C_2$-$C_4$ acyl and carbamoyl, and, optionally, carries 1 or 2 benzo-fused saturated, unsaturated or aromatic, carbocyclic or heterocyclic rings;

or $Z^2$ is hydrogen, hydroxyl, amino, phenyl, ($C_1$-$C_4$)-alkylene-phenyl, $C_5$-$C_{30}$ cycloalkyl, $C_2$-$C_{30}$ alkenyl, or is branched or unbranched $C_1$-$C_{30}$ alkyl, wherein the phenyl, ($C_1$-$C_4$)-alkylene-phenyl, $C_5$-$C_{30}$ cycloalkyl, $C_2$-$C_{30}$ alkenyl or the $C_1$-$C_{30}$ alkyl is, optionally, substituted by one or more substituents selected from the group consisting of Cl, Br, CN, $NH_2$, OH, $C_6H_5$, $C_6H_5$ substituted by 1, 2 or 3 $C_1$-$C_{20}$ alkoxy radicals, carbamoyl, carboxyl, $C_2$-$C_4$ acyl, $C_1$-$C_8$ alkyl, $NR^2R^3$, where $R_3$ and $R^3$ are as defined above, and $C_1$-$C_4$ alkoxy or wherein the $C_1$-$C_{30}$ alkyl group or the $C_2$-$C_{30}$ alkenyl group is perfluorinated or partly fluorinated;

G is a divalent group —CO—, —$C_2$—, —$SO_2N(R^5)$—$R^5$—CO—, —$SO_2N(R^6)$—$R^5$—$SO_a$—, —$CON(R^6)$—$R^5$—CO— or —$CON(R^6)$—$R^5$—$S0_2$—, and $R^5$ is a divalent branched or unbranched, saturated or unsaturated, aliphatic hydrocarbon radical having 1 to 20 carbon atoms, a $C_5$-$C_7$ cycloalkylene radical, or a divalent aromatic radical having 1, 2 or 3, aromatic rings, wherein, optionally, the 1, 2 or 3 aromatic rings are in fused form or are linked by a bond, wherein the aliphatic hydrocarbon, cycloalkylene, aromatic and heteroaromatic radicals are, optionally, substituted by 1, 2, 3 or 4 substituents selected from the group consisting of OH, CN, F, Cl, Br, $NO_2$, $CF_3$, $C_1$-$C_8$ alkoxy, S—$C_1$-$C_6$ alkyl, $NHCONH_2$, $NHC(NH)NH_2$, NHCO—$C_1$-$C_6$ alkyl, $C_1$-$C_6$ alkyl, $COOR^{20}$, $CONR^{20}R^{21}$, $NR^{20}R^{21}$, $SO_3R^{20}$ and $SO_2$—$NR^{20}R^{21}$, $R^{20}$ and $R^{21}$ being identical or different and being hydrogen, phenyl or $C_1$-$C^6$ alkyl, and $R^6$ is hydrogen, $R^5$—H, $R^5$—COO⁻$E^+$ or $R^5$—$SO_3^-E^+$; and $E^+$ is $H^+$; the equivalent $M^{s+}$,s of a metal cation $M^{s+}$, , s being one of the numbers 1, 2 or 3;
  a phosphonium ion; or an unsubstituted or substituted ammonium ion.

10. The method as claimed in claim 1, wherein the at least one pigment dispersant is used in an amount of 0.1% to 26% by weight, based on the crude phthalocyanine pigment.

11. The method as claimed in claim 1, wherein the mixture further comprises at least one auxiliary selected from the group consisting of surfactants, nonpigmentary d ispersants, p igmentary dispersants, fillers, standardizers, resins, waxes, defoamers, antidust agents, extenders, shading colorants, preservatives, drying retarders, rheology control additives, wetting agents, antioxidants, UV absorbers, light stabilizers, and mixtures thereof.

12. The method as claimed in claim 9, wherein the metal atom is Cu.

13. The method as claimed in claim 9, wherein the phthalocyanine radical is chlorinefree.

14. The method as claimed in claim 9, wherein h is from 0 to 20.

15. The method as claimed in claim 9, wherein h is 0, 1, 2, 3, 4 or 5.

16. The method as claimed in claim 9, wherein at least one of $R^2$ and $R^3$ are substituted by hydroxyl, phenyl, cyano, chlorine, bromine, amino, $C_2$-$C_4$ acyl or $C_1$-$C_4$ alkoxy, and wherein the number of substitutions is 1 to 4.

17. The method as claimed in claim 9, wherein the $C_1$-$C_4$ alkoxy is methoxy or ethoxy.

18. The method as claimed in claim 9, wherein the 1, 2, or 3 aromatic rings are linked by a bond selected from the group consisting of phenyl, biphenyl, naphthyl radical, and a heterocyclic radical having 1, 2 or 3 rings and containing 1, 2, 3 or 4 heteroatoms selected from the group consisting of O, N and S, or a mixture thereof.

19. The method as claimed in claim 9, wherein the metal cation $M^{s+}$ is selected from main groups 1 to 5 or from transition groups 1 or 2 or 4 to 8 of the Periodic Table of the Chemical Elements.

20. A method for the production of a phthalocyanine pigment preparation comprising the steps of finely dividing a crude phthalocyanine pigment by a method selected from the group consisting of dry grinding, wet grinding in an inert liquid medium in a conventional continuous or discontinuous low-energy agitated ball mill operated with a power density at less than 2.5 kW per liter of grinding space and with a peripheral stirrer speed of less than 12 m/s under the action of grinding media, salt kneading, acid pasting and acid swelling to form a prepigment and subjecting the prepigment to a finish treatment in a mixture of water and an organic solvent at a pH greater than or equal to 11, at a temperature of 100° C. to 250° C., and in the presence of at least one pigment dispersant selected from the group consisting of phthalocyaninesulfonic acids, phthalocyaninecarboxylic acids, phthalocyaninesulfonic salts, phthalocyaninecarboxylic salts and phthalocyaninesulfonamides.

* * * * *